Figure 1:
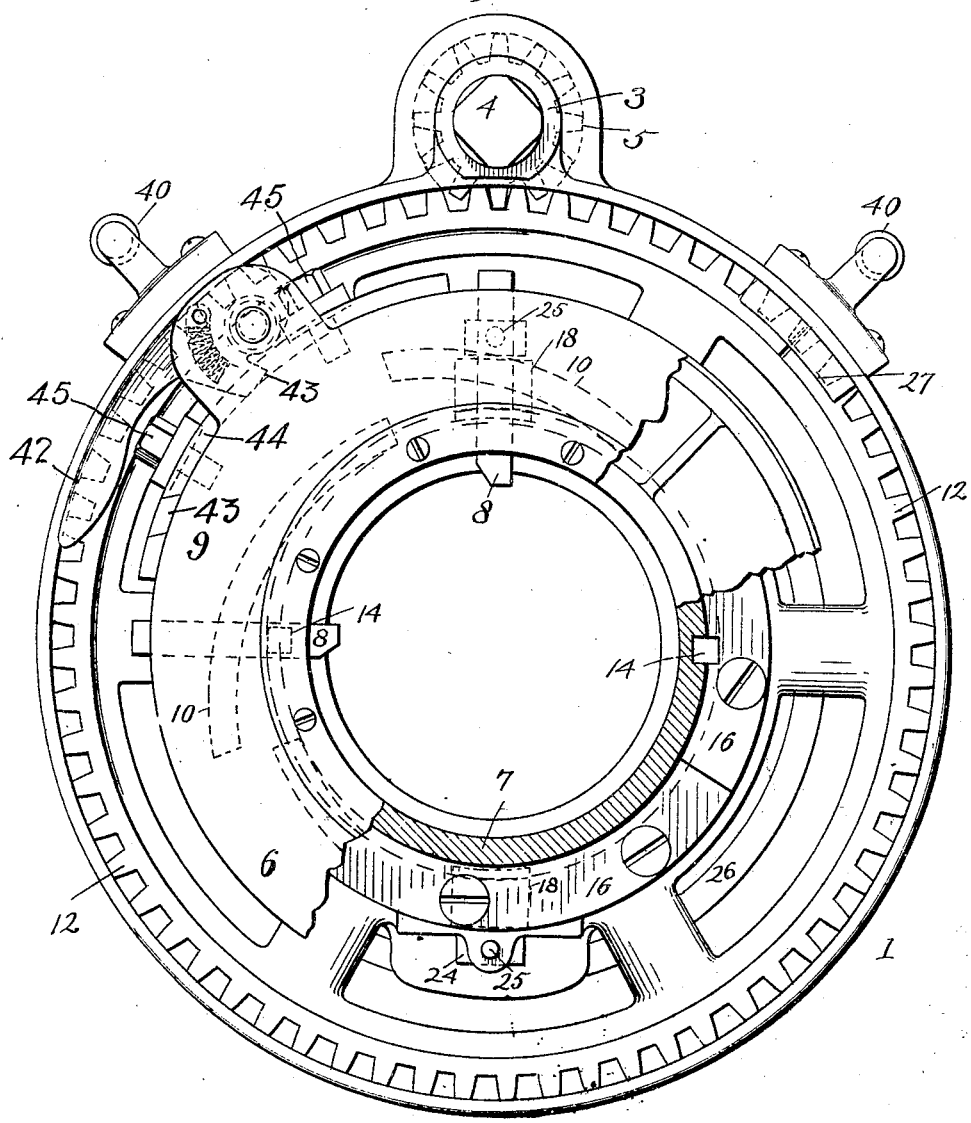

H. W. OSTER.
GEARED DIE STOCK.
APPLICATION FILED FEB. 28, 1907.

925,220.

Patented June 15, 1909.
3 SHEETS—SHEET 1.

Witnesses
E. B. Gilchrist
H. P. Sullivan

Inventor
Herman W. Oster
By Thurston Woodward
Attorney

H. W. OSTER.
GEARED DIE STOCK.
APPLICATION FILED FEB. 28, 1907.

925,220.

Patented June 15, 1909.
3 SHEETS—SHEET 2.

Witnesses
E. B. Gilchrist
H. B. Sullivan

Inventor
Herman W. Oster
By Thurston Woodward
attorneys

H. W. OSTER.
GEARED DIE STOCK.
APPLICATION FILED FEB. 28, 1907.

925,220.

Patented June 15, 1909.
3 SHEETS—SHEET 3.

Witnesses:
E. B. Gilchrist
H. P. Sullivan

Inventor
Herman W. Oster
By Thurston Woodward
Attorneys

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

GEARED DIE-STOCK.

No. 925,220.　　　　Specification of Letters Patent.　　　Patented June 15, 1909.

Application filed February 28, 1907. Serial No. 359,738.

*To all whom it may concern:*

Be it known that I, HERMAN W. OSTER, a citizen of the United States, residing at Cleveland, in the county of Cuyahoga and State of Ohio, have invented a certain new and useful Improvement in Geared Die-Stocks, of which the following is a full, clear, and exact description.

The object of this invention is to provide a machine, especially adapted for threading large pipes, which may be easily disengaged from a pipe after the threads have been cut thereon without being obliged to turn the mechanism backward to unscrew it.

The invention includes a body capable of holding the pipe which is to be threaded, a cutter head capable of turning and of moving endwise upon said body,—these parts being respectively provided with lead threads and with movable devices having threads for engagement with said lead threads,—means being provided for holding said devices in operative position and for automatically moving them out of operative position after the cutter head has moved a predetermined distance upon the body, lengthwise thereof.

The invention includes the combination of parts above mentioned as well as more specific combinations of parts contained in the embodiment of the invention, as shown in the drawing, all of which is hereinafter described and definitely pointed out in the claims.

Figure 2:
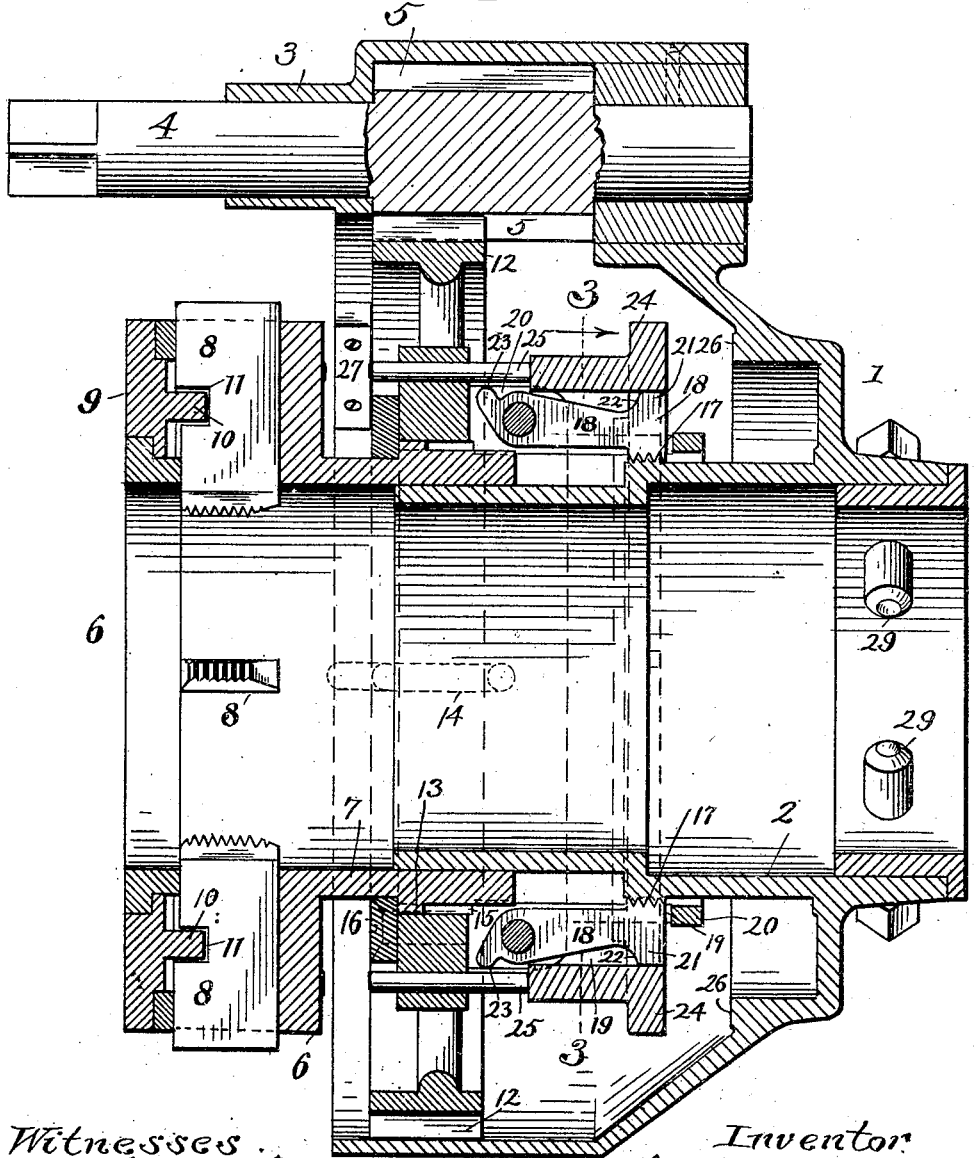
Figure 3:
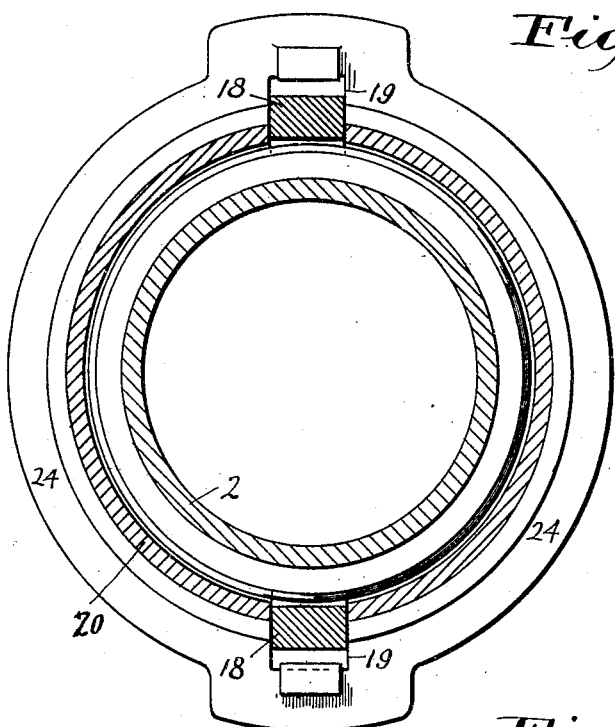
Figure 4:
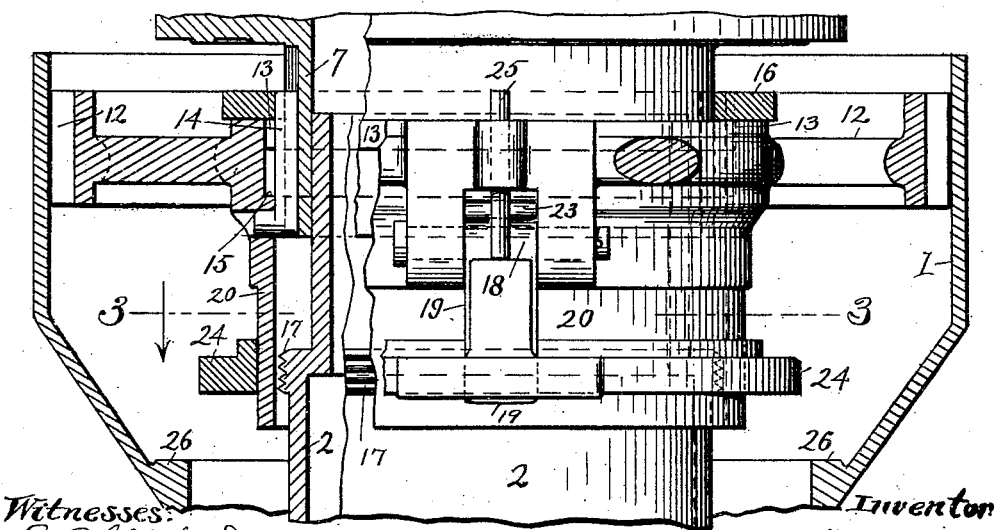

In the drawings, Figure 1 is an end view, with some of the parts broken away and sectioned, of a geared die stock embodying the invention. Fig. 2 is a central longitudinal section thereof. Fig. 3 is a sectional view on the line 3—3 of Fig. 2. Fig. 4 is a side view partly sectioned of a part of said die stock.

Referring in detail to the parts of the embodiment of the invention shown in the drawings, 1 represents the body of the device. It includes a cylindrical barrel 2, and a bearing 3, suitably connected therewith, for the operating shaft 4,—said shaft being provided with a long pinion 5.

6 represents the cutter head having a cylindrical sleeve-like extension 7 which is rotatably mounted upon the barrel 2 of the body. The head 6 carries the radially movable chasers or thread cutting dies 8; and any suitable mechanism for moving them into and out of working position may be provided. The means shown for this purpose are of familiar construction, consisting of a plate 9 rotatively held upon the end of the head, and provided with cam ribs 10 which engage in notches 11 in the edges of the chasers. A gear 12 is fitted upon this cutter-head sleeve 7, embracing an annular flange 13 thereon. A key 14 connects this sleeve 7 and gear together and thereby compels them to rotate in unison but permits them to move endwise relatively to each other. The gear is provided with an annular shoulder 15, which is opposed to one side of said flange 13, and is adapted to engage therewith so as to limit the relative endwise movement of the gear and sleeve in one direction. A ring 16 embraces the sleeve on the opposite side of this flange 13 and is securely fastened to the hub of the gear. It is adapted to engage with said flange and thereby limit the relative motion of the sleeve and gear in the other direction.

On the outer periphery of the barrel 2 lead threads 17 are cut, and they are adapted to be engaged by the threaded faces of levers 18. These levers lie and are pivoted in slots 19 in a sleeve 20 which is rigidly connected with the gear 12. This lever 18 has at its outer end an outwardly extended enlargement 21 having a beveled face 22; and said lever has at its other end, *i. e.* on the opposite side of its pivot, an outwardly extended tail piece 23. A floating ring 24 embraces these levers, and, when in the position shown in Fig. 2, engages with the outer surfaces of the projections 21, and thereby holds the levers in engagement with the lead threads 17. There are several rods 25 lying parallel with the axis of the body and head, and passing loosely through holes in the hub of the gear 12, and occupying such positions that they may engage with one end of this floating ring. In the body is a shoulder 26 with which the other end of this floating ring may engage. Secured in the body are blocks 27 arranged so that they will be engaged by the gear 12, when the gear is in the position it should occupy when the device is ready to begin to thread a pipe.

In operating the device, the pipe to be threaded is passed through the end of the body toward and into engagement with the chasers, and is made fast to the body and properly centered by screws 29. Then, by means of a crank, not shown, to be attached to shaft 4, this shaft is turned. The result is that gear 12 and the cutter head are turned. The engagement of the levers 18 with the lead threads 17 draws the head inward along the barrel of the body at the proper rate, and the chasers begin to cut the threads upon the pipe. This cutter head is so drawn along as it rotates, until the threads on the pipe have been well started and until threads on levers 18 run off of the lead screw threads 17 on the barrel 2. The chasers have now cut such a thread upon the pipe that as the cutter head is further turned these chasers will cause the head to properly move lengthwise of the pipe being threaded. After the levers 18 run off the lead screw threads 17, the lengthwise movement of the gear 12 will be temporarily discontinued, but said movement of the cutter head will continue until the flange 13 comes in contact with shoulder 15. Thereafter the gear will also move lengthwise with the cutter head. After a suitable period, and when the thread on the pipe is nearly as long as required, the floating ring 24, which has been moving along with the gear and the levers 18, will strike against shoulder 26 and will be stopped. The continued movement of the cutter head and gear will carry these levers along until the tail pieces 23 thereon engage with the rear end of the floating ring, and thereby the levers are thrown outward, thereby carrying their threads out of range of the lead threads 17 on the barrel. The cutting of the thread on the pipe will now be substantially complete.

In order to move the device from the threaded pipe without having to screw it backward, the chasers are drawn outward by the action of the cam ring 9. The operator now takes hold of the cutter head, and pulls it out. The flange 13 will engage with the ring 16 and will pull the gear along with it until it is stopped by blocks 27. This will draw the levers 18 backward and the floating ring will go with them. The cutter head is then pushed inward a short distance. It will strike the ends of the rods 25 and will push them inward and they will push the floating ring inward. This ring, by engaging with the inclines 22 on levers 18, will swing said levers inward and cause their screw threads to engage with the lead screw threads 17. The cutter head is then drawn back to the position shown in Fig. 2, and the device is in readiness to operate on another pipe to thread the same. The handles 40 are attached to the body and afford convenient means by which the die stock may be lifted and carried from one place to another.

At the left side and near the top of Fig. 1 are shown some parts which have nothing to do with the invention herein claimed. They are valuable practical adjuncts of a machine in which the present invention is embodied; but they might be omitted without affecting the operation of the invention herein defined by the claims. Referring to these parts 42 represents a lever which is pivoted to an ear on the cam plate 9. A toe of this lever is adapted to enter either notch 43 in a plate 44 which is adjustably secured to the head 6 by bolts 45. There are two of these notches 43 in the plate 44, as shown,—the toe of the lever being in the one indicated by dotted lines. There may, however, be as many of these notches as desired. This plate 44 is adjusted on the head until it reaches such a position that when the toe of lever 42 is in one of these notches the cam plate 9 will be in that position which will hold the dies 8 in the proper position to cut threads on the particular pipe upon which they are to be cut. After the thread is cut the dies may be withdrawn from the threaded pipe by swinging lever 42 outward so as to disengage its toe from the notch 43, and then turning the cam plate. To set the cam plate so that the device is ready to cut threads on another plate of the same diameter, the cam plate, when turned to the proper position, is there locked by the engagement of the toe of lever 42 with a notch 43. It will be understood that there are slots in plate 44 whereby it may be moved upon bolts 45, which bolts, when the plate has been moved to the proper position, clamp it firmly against the head.

Having described my invention, I claim:

1. The combination of a body having means for holding the pipe to be threaded, a cutter head which is rotatively mounted upon said body and is capable of being moved lengthwise thereof, said body and die stock being respectively provided with lead threads and with a movable threaded device for engagement with said lead threads, a longitudinally movable member for holding said device in operative position, and means which, after the cutter head has moved a definite distance relative to the body, will engage with said member and move it away from the position in which it so holds said threaded device.

2. The combination of a body having a cylindrical barrel whereon are external lead threads, a cutter head having a cylindrical sleeve which is rotatively mounted upon said barrel, a gear non-rotatively secured upon said sleeve, a long pinion rotatably mounted in the body engaging with said gear, levers carried by said gear and having threaded faces for engaging with said lead threads, means for holding said levers in operative position, and means which are caused to operate by the endwise movement of the cutter head relative to the body for moving said holding means away from the holding position.

3. The combination of a body having a cylindrical barrel whereon are external lead threads, a cutter head having a cylindrical sleeve which is fitted upon said barrel, means for rotating said sleeve, devices having threaded faces adapted to engage with said lead threads,—which devices are movably connected with said cutter head, means for holding said devices in operative position for engagement with said lead threads, and means which are caused to operate by a definite longitudinal movement of the cutter head relative to the body for positively withdrawing said threaded devices from engagement with the lead threads.

4. The combination of a body having a cylindrical barrel whereon are external lead threads, a cutter head having a cylindrical sleeve which is fitted upon said barrel, pivoted levers carried by said sleeve and having threaded faces adapted to engage with said lead threads, a ring which embraces all of said levers and normally holds them in operative position, a shoulder upon the body adapted to be engaged by said ring after it has moved a definite distance lengthwise of the body, said levers having tail pieces projecting into the plane of said ring and adapted to be engaged thereby after the ring has been stopped through engaging with said shoulder.

5. The combination of a body having a cylindrical barrel whereon are external lead threads, a cutter head having a cylindrical sleeve which is fitted upon said barrel, a gear non-rotatively mounted upon said sleeve but capable of a limited longitudinal motion thereon, means on the sleeve for limiting said motion, levers pivoted to a part of said gear, each of which levers has a threaded face for engaging with said lead threads and a tail piece, a floating ring embracing all of said levers and adapted to hold them in operative position, a shoulder on the body adapted to be engaged by said ring to stop endwise movement, whereby, as said cutter head and sleeve continue their endwise movement, the tail piece of said levers are brought into engagement with said ring and the levers thereby withdrawn to inoperative positions.

6. The combination of a body having a cylindrical barrel whereon are external lead threads, a cutter head having a cylindrical sleeve which is fitted upon said barrel, a gear non-rotatively mounted upon said sleeve but capable of a limited longitudinal motion thereon, means on the sleeve for limiting said motion, levers pivoted to a part of said gear, each of which levers has a threaded face for engaging with said lead threads, and a tail piece, a floating ring embracing all of said levers and adapted to hold them in operative position, a shoulder on the body adapted to be engaged by said ring and to prevent it from moving endwise, whereby, as said die stock and sleeve continue their endwise movement, the tail pieces of said levers are brought into engagement with said ring and the levers thereby withdrawn to inoperative positions, rods movably mounted in the hub of said gear in positions to engage the end of said ring and part of the cutter head.

7. The combination of a body having a cylindrical barrel whereon are external lead threads, a shaft mounted in said body with its axis parallel with the axis of the barrel and having a long pinion, a cutter head having a sleeve which is movably mounted upon said barrel, said sleeve having an external annular flange, a gear fitted upon said flange and keyed to said barrel, annular shoulders carried by said gear and located on opposite sides of said flange, levers pivoted to a part of said gear and having lead threads on their inner faces near one end and having, outside of said threaded faces, inclined projections and having on the opposite sides of their pivots outwardly extended tail pieces, a floating ring embracing said levers and engaging the said bosses, whereby said levers are held in operative positions, a shoulder on the body adapted to be engaged by said ring, and rods mounted in holes in the hub of said gear and lying parallel with the axis thereof and movable lengthwise, said rods being located in planes where their front ends will be opposed to the ends of the floating ring and their rear ends opposed to a part of the cutter head.

In testimony whereof, I hereunto affix my signature in the presence of two witnesses.

HERMAN W. OSTER.

Witnesses:
E. B. GILCHRIST,
E. L. THURSTON.